(12) United States Patent
Louh

(10) Patent No.: US 9,568,658 B2
(45) Date of Patent: Feb. 14, 2017

(54) BACKLIGHT MODULE AND METHOD FOR MANUFACTURING THE SAME

(71) Applicant: HON HAI PRECISION INDUSTRY CO., LTD., New Taipei (TW)

(72) Inventor: Sei-Ping Louh, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 268 days.

(21) Appl. No.: 14/262,820

(22) Filed: Apr. 28, 2014

(65) Prior Publication Data

US 2015/0160398 A1 Jun. 11, 2015

(30) Foreign Application Priority Data

Dec. 11, 2013 (TW) .............................. 102145743 A

(51) Int. Cl.
*F21V 8/00* (2006.01)

(52) U.S. Cl.
CPC ............ *G02B 6/0031* (2013.01); *G02B 6/0025* (2013.01); *G02B 6/0051* (2013.01); *G02B 6/0055* (2013.01); *G02B 6/0065* (2013.01); *Y10T 29/49885* (2015.01)

(58) Field of Classification Search
CPC ..... G02B 6/0073; G02B 6/005; G02B 6/0068; G02B 6/0088; G02B 6/0053; G02B 6/0091; G02B 6/0016; G02B 6/0011; G02B 6/0018; G02B 6/0043; G02B 6/0051; G02B 6/0031; G02B 6/0025; G02B 6/0055; G02B 6/0065; F21Y 2101/02; F21V 13/10; F21V 13/12; Y10T 29/49885
See application file for complete search history.

(56) References Cited

U.S. PATENT DOCUMENTS

| | | | |
|---|---|---|---|
| 5,995,288 A * | 11/1999 | Kashima | G02B 5/021 359/599 |
| 8,770,819 B2 * | 7/2014 | Tanaka | G02B 6/0028 349/61 |
| 2008/0291696 A1 | 11/2008 | Kim et al. | |

FOREIGN PATENT DOCUMENTS

| | | |
|---|---|---|
| CN | 101162278 A | 4/2008 |
| CN | 102069651 A | 5/2011 |
| CN | 103162177 A | 6/2013 |
| TW | M314903 | 7/2007 |
| TW | 201124776 A | 7/2011 |

* cited by examiner

*Primary Examiner* — Stephen F Husar
*Assistant Examiner* — Danielle Allen
(74) *Attorney, Agent, or Firm* — Zhigang Ma

(57) ABSTRACT

A backlight module includes a light guiding plate, a pattern structure, a number of LEDs, a reflecting plate, a diffusing layer, and a prism film. The pattern structure is adhered on a bottom of the light guiding plate. The LEDs are mounted on the bottom of the light guiding plate and the reflecting plate is adhered on a bottom of the pattern structure. The diffusing layer is adhered on a top of the light guiding plate. The prism film is adhered on a top of the diffusing layer.

20 Claims, 6 Drawing Sheets

BACKLIGHT MODULE AND METHOD FOR MANUFACTURING THE SAME

BACKGROUND

1. Technical Field

The present disclosure relates to backlight modules, and more particularly to a direct-type backlight module using LEDs (light emitting diodes) as a light source.

2. Description of Related Art

LEDs have been widely promoted as light sources of backlight modules owing to many advantages, such as high luminosity, low operational voltage and low power consumption. A traditional direct type backlight module used for illuminating a planar display device such a liquid crystal display (LCD), includes a plurality of elements, such as a light guiding plate, a plurality of LEDs mounted on a printed circuit board, a reflecting plate, a diffusing layer, a prism film etc. However, the elements of the backlight module takes up a lot of space, which cannot meet consumers' requirements of lighter weight and smaller size.

Therefore, a backlight module which is capable of overcoming the above described shortcomings is desired.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 5:
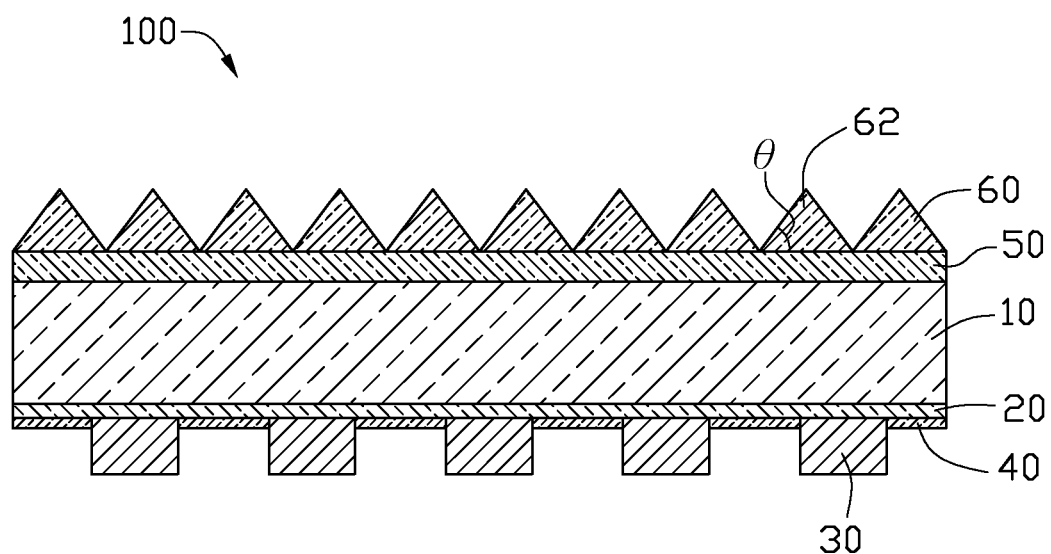

Please referring to FIG. 5 firstly, a backlight module 100 in accordance with one embodiment of the present disclosure, which can be used for illuminating a planar display device such a liquid crystal display (LCD), includes a light guiding plate 10, a pattern structure 20, a plurality of LEDs 30, a reflecting plate 40, a diffusing layer 50, and a prism film 60. The pattern structure 20 is adhered on a bottom of the light guiding plate 10. The LEDs 30 are mounted on the bottom of the light guiding plate 10 and the reflecting plate 40 is adhered on a bottom of the pattern structure 20. The diffusing layer 50 is adhered on a top of the light guiding plate 10. The prism film 60 is adhered on a top of the diffusing layer 50.

Figure 1:
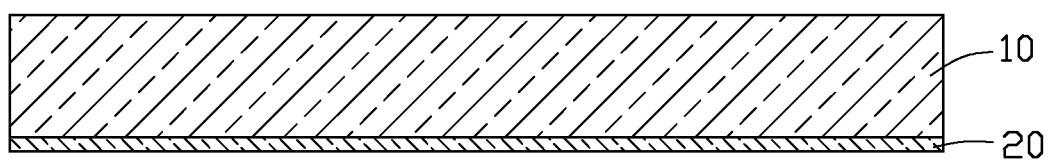
FIGS. 1-5 are cross-sectional views illustrating steps of a method for manufacturing a backlight module in accordance with one embodiment of the present disclosure.

Referring to FIGS. 1-5, a method for manufacturing the backlight module 100 is shown, which includes steps described as follows:

Firstly, provide a light guiding plate 10 (referring to FIG. 1).

In this embodiment, the material of the light guiding plate 10 can be glass with good heat-resistant property and good scratch-resistant capability. The light guiding plate 10 when made of glass can be formed by glass rolling process, whereby the light guiding plate 10 can be mass produced by a roll to roll in-line manufacturing of glass sheet. The glass light guiding plate 10 further has an advantage that its dimension is not easily changeable due to temperature variation. The light guiding plate 10 has a thickness in a range from 0.1 mm (millimeter) to 0.2 mm (millimeter). The light guiding plate 10 has good surface smoothness, so that regular total reflection occurs to most of light traveling through the light guiding plate 10.

Secondly, coat an optical-grade acryl material with high reflecting ability on a bottom of the light guiding plate 10 via screen printing process or embossed printing process, whereby a pattern structure 20 is formed on the bottom of the light guiding plate 10.

In this embodiment, the pattern structure 20 includes a plurality of dots (not shown). Each dot has a spherical surface protruding downwardly from the bottom of the light guiding plate 10 for reflecting light emitted from a light source. A height of the dot is about 3-5 µm (micron), and a diameter of a sphere for forming the spherical surface is about 30-50 µm.

Figure 2:
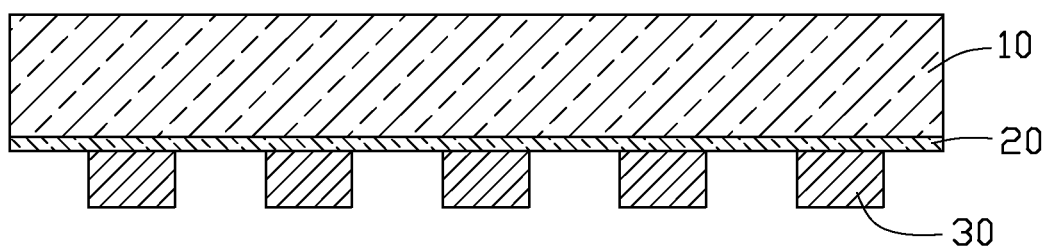

Thirdly, adhere a plurality of LEDs 30 on a bottom of the light guiding plate 10 directly or by chip on glass (COG) technology (referring to FIG. 2).

In this embodiment, the LEDs 30 are arranged in a matrix on the bottom of the light guiding plate 10 and among the dots of the patter structure 20. Since the LEDs 30 are adhered on the bottom of the light guiding plate 10 directly or by chip on glass (COG) technology, a printed circuit board for mounting the LEDs 30 thereon is saved, and a space occupied by the printed circuit board is also saved. Screen printing of silver wiring or copper wiring on the bottom of the light guiding plate 10 can be performed to form a circuitry (not shown) thereon to electrically connect the LEDs together 30. The circuitry has a height of 0.52 mm and is also used for electrically connecting the LEDs 30 with an external power source.

Figure 3:
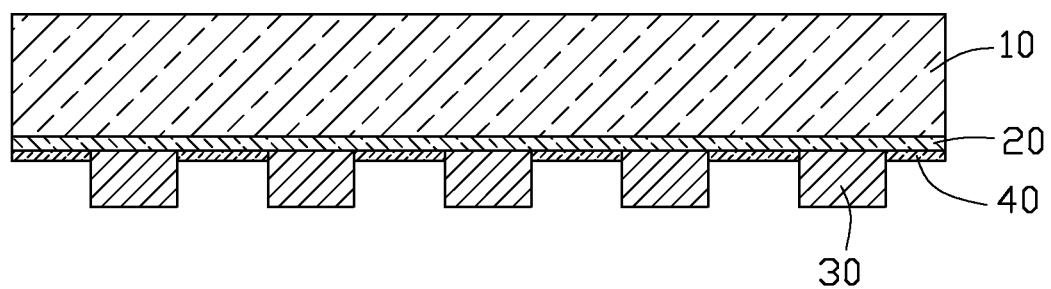

Fourthly, forming a reflecting plate 40 via spraying, vacuum coating or screen printing reflecting material on the bottom of the pattern structure 20 (referring to FIG. 3).

In this embodiment, a plurality of through holes (not labeled) arranged in a matrix are defined in the reflecting plate 40 and the pattern structure 20, through which the LEDs 30 extend. Light escaping from the pattern structure 20 is reflected back to the pattern structure 20 by the reflecting plate 40, so that the light utilizing efficiency of the backlight module 100 is improved.

Figure 4:
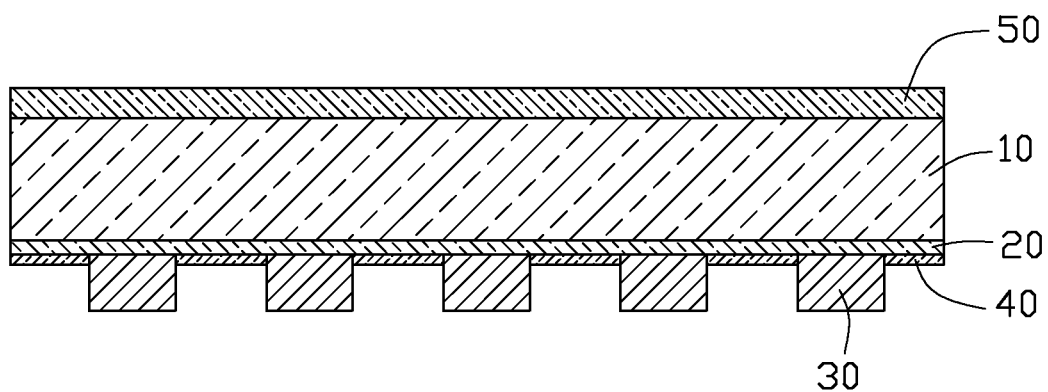

Fifthly, spraying, coating or screen printing diffusing grains on a top of the light guiding plate 10 to form a diffusing layer 50 (referring to FIG. 4).

In this embodiment, the diffusing grains are made of a material selected from silicon dioxide powder or alumina powder. The diffusing layer 50 is configured for uniformly diffusing light emitted from the LEDs 30, thereby avoiding the occurrence of intensive light spots intended for illumination, and light outputs from the light guiding plate 10 is evenly distributed.

Sixthly, forming a prism film 60 on a top of the diffusing layer 50 via roll to roll process or embossed printing process of acrylic glue on the top of the diffusing layer 50 (referring to FIG. 5).

In this embodiment, the prism film 60 is made of a material selected from an optical-grade acryl material. The prism film 60 has a thickness in a range from 50 µm (micron) to 300 µm (micron). The prism film 60 includes a plurality of prism protrusions 62 evenly arranged on a top face of the diffusing layer 50. Each prism protrusion 62 has a cross section with a shape of a triangle. The prism protrusions 62 are continuously connected together and cover substantially the whole top face of the diffusing layer 50. A base angle θ of each prism protrusion 62 is 45 degrees. The prism film 60 is used for changing the direction of light which transmits from the diffusing layer 50 to a desired visual direction, i.e. normal direction.

Figure 6:
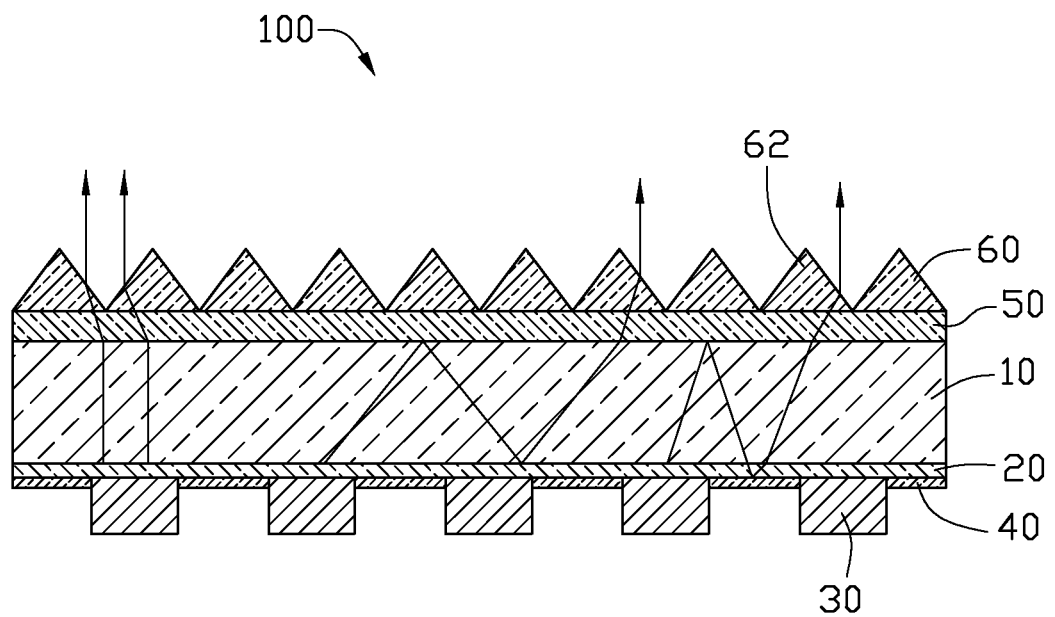
FIG. 6 is a cross-sectional view of the backlight module of the present disclosure, wherein LEDs are powered to emit light.

Referring to FIG. 6, when the LEDs 30 are powered to emit light, a first part of light emitted from the LEDs 30 with a smaller light outputting angle deviating from the normal direction directly travels through the light guiding plate 10 and is then refracted through the diffusing layer 50 and the prism film 60 in sequence to travel to an outside of the backlight module 100. A second part of light emitted from the LEDs 30 with a bigger light outputting angle deviating from the normal direction directly radiates on a first interface between the diffusing layer 50 and the light guiding plate 10 (i.e. a bottom face of the diffusing layer 50), and then is reflected by the diffusing layer 50 to a second interface between the pattern structure 20 and the light guiding plate 10 (i.e. a top face of the pattern structure 20), and then is reflected by the pattern structure 20 to the light guiding plate 10 to travel through the light guiding plate 10 and finally is refracted through the diffusing layer 50 and the prism film 60 in sequence to travel to the outside of the backlight module 100. A third part of light emitted from the LEDs 30 with a bigger light outputting angle deviating from the normal direction directly radiates on the first interface between the diffusing layer 50 and the light guiding plate 10 (i.e. the bottom face of the diffusing layer 50), and then is reflected by the diffusing layer 50 to a third interface between the pattern structure 20 and the reflecting plate 40 (i.e. a top face of the reflecting plate 40), and then is reflected by the reflecting plate 40 to travel, in refracted manner, through the pattern structure 20 and then the light guiding plate 10, the diffusing layer 50 and the prism film 60 in sequence to travel to the outside of the backlight module 100. The third part of light emitted from the LEDs 30 has the light outputting angle smaller than that of the second part of light emitted from the LEDs 30, but bigger than that of the first part of light emitted from the LEDs 30.

According to the backlight module 100 of the present disclosure, the reflecting plate 40, the LEDs 30, the pattern structure 20, the light guiding plate 10, the diffusing layer 50 and the prism film 60 are intimately assembled together, and the whole backlight module 100 has a thickness less than 0.85 mm (millimeter).

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A backlight module, comprising:
    a light guiding plate;
    a diffusing layer adhered on a top of the light guiding plate to form a first interface between the diffusing layer and the light guiding plate;
    a prism film adhered on a top of the diffusing layer;
    a pattern structure adhered on a bottom of the light guiding plate to form a second interface between the pattern structure and the light guiding plate;
    a plurality of LEDs adhered on the bottom of the light guiding plate; and
    a reflecting plate adhered on a bottom of the pattern structure to form a third interface between the reflecting plate and the pattern structure;

wherein when the LEDs are powered to emit light, a first part of light emitted from the LEDs directly travels through the light guiding plate, the diffusing layer, and the prism film in sequence to an outside of the backlight module;
    a second part of light emitted from the LEDs directly radiates on the first interface between the diffusing layer and the light guiding plate, and then is reflected by the diffusing layer to the second interface between the pattern structure and the light guiding plate, and then is reflected by the pattern structure to the light guiding plate, and then travels through the light guiding plate, the diffusing layer and the prism film in sequence to the outside of the backlight module; and
    a third part of light emitted from the LEDs directly radiates on the first interface between the diffusing layer and the light guiding plate, and then is reflected by the diffusing layer to the third interface between the pattern structure and the reflecting plate, and then is reflected by the reflecting layer to the pattern structure, and then travels through the pattern structure, the light guiding plate, the diffusing layer and the prism film in sequence to the outside of the backlight module.

2. The backlight module of claim 1, wherein the light guiding plate is made of glass and has a thickness in a range from 0.1 mm to 0.2 mm.

3. The backlight module of claim 1, wherein the pattern structure comprises a plurality of dots, each of the dots having a spherical surface for reflecting light emitted from the LEDs.

4. The backlight module of claim 1, wherein the LEDs are arranged in a matrix on the bottom of the light guiding plate.

5. The backlight module of claim 4, wherein a plurality of through holes arranged in a matrix are defined in the reflecting plate and the pattern structure, the LEDs extending through the plurality of through holes.

6. The backlight module of claim 1, wherein the pattern structure is made of a material selected from an optical-grade acryl material with high reflecting ability.

7. The backlight module of claim 1, wherein the prism film has a thickness in a range from 50 microns to 300 microns.

8. The backlight module of claim 1, wherein the prism film comprises a plurality of prism protrusions evenly arranged on a top face of the diffusing layer.

9. The backlight module of claim 8, wherein each prism protrusion has a cross section with a shape of a triangle.

10. The backlight module of claim 8, wherein the prism protrusions are continuously connected together and cover substantially the whole top face of the diffusing layer.

11. The backlight module of claim 8, wherein a base angle of each prism protrusion is 45 degrees.

12. A method for manufacturing a backlight module comprising steps:
    providing a light guiding plate;
    forming a pattern structure on a bottom of the light guiding plate via screen printing process or embossed printing process;
    adhering a plurality of LEDs on the bottom of the light guiding plate;
    forming a reflecting plate via spraying, vacuum coating or screen printing reflecting material on a bottom of the pattern structure;
    spraying, coating or screen printing diffusing grains on a top of the light guiding plate to form a diffusing layer; and forming a prism film on a top of the diffusing layer via roll to roll process or embossed printing process.

13. The method for manufacturing the backlight module of claim 12, wherein the material of the light guiding plate is glass with good heat-resistant property and good scratch-resistant capability.

14. The method for manufacturing the backlight module of claim 12, wherein the light guiding plate is formed by glass rolling process.

15. The method for manufacturing the backlight module of claim 12, wherein the pattern structure is formed by printing an optical-grade acryl material with high reflecting ability on the bottom of the light guiding plate.

16. The method for manufacturing the backlight module of claim 12, wherein the diffusing grains are made of a material selected from silicon dioxide powder or alumina powder.

17. The method for manufacturing the backlight module of claim 12, wherein the prism film is made of a material selected from an optical-grade acryl material.

18. A backlight module, comprising:
a glass light guiding plate;
a diffusing layer adhered on a top of the light guiding plate to form a first interface between the diffusing layer and the light guiding plate;
a prism film adhered on a top of the diffusing layer;
a pattern structure adhered on a bottom of the light guiding plate to form a second interface between the pattern structure and the light guiding plate;
a reflecting plate adhered on a bottom of the pattern structure to form a third interface between the reflecting plate and the pattern structure; and
a plurality of LEDs adhered on the bottom of the light guiding plate and extending downwardly through the pattern structure and the reflecting plate.

19. The backlight module of claim 18, wherein the glass light guiding plate, the pattern structure, the reflecting plate, the plurality of LEDs, the diffusing layer and the prism film in combination have a thickness less than 0.85 mm.

20. The backlight module of claim 18, wherein the LEDs are arranged in a matrix on the bottom of the light guiding plate; a plurality of through holes arranged in a matrix are defined in the reflecting plate and the pattern structure, the LEDs extending through the plurality of through holes.

* * * * *